United States Patent [19]
Kokubo et al.

[11] Patent Number: 6,106,972
[45] Date of Patent: Aug. 22, 2000

[54] BATTERY COOLING SYSTEM

[75] Inventors: Akihisa Kokubo, Okazaki; Katsuya Ishii, Anjo; Keiichiro Banzai, Toyota, all of Japan

[73] Assignee: Denso Corporation, Kariya, Japan

[21] Appl. No.: 09/108,941

[22] Filed: Jul. 1, 1998

[30] Foreign Application Priority Data

Jul. 2, 1997 [JP] Japan .................................. 9-177402

[51] Int. Cl.⁷ .................................................. H01M 10/50
[52] U.S. Cl. .................................................. 429/120
[58] Field of Search ........................................ 429/120

[56] References Cited

U.S. PATENT DOCUMENTS

| | | |
|---|---|---|
| 4,329,407 | 5/1982 | Gross et al. ........................... 429/101 |
| 4,415,847 | 11/1983 | Galloway .................................. 320/2 |
| 5,625,742 | 4/1997 | Boffito et al. ......................... 392/345 |

*Primary Examiner*—Carol Chaney
*Attorney, Agent, or Firm*—Harness, Dickey & Pierce, PLC

[57] ABSTRACT

A cooling apparatus communicates through a communicating pipe with an inside space of an airtight casing in which a plurality of battery cells are hermetically held. The cooling apparatus and the inside space of the airtight casing are filled with high boiling point coolant. The coolant absorbs heat developed by the plurality of battery cells in the airtight casing so that it evaporates. The evaporated (gaseous) coolant rises toward the cooling apparatus and is condensed in the cooling apparatus. Then the condensed (liquid) coolant returns to around the battery cells by its self-weight. Accordingly, the battery cells are uniformly and efficiently cooled not to have variation in temperature therein.

35 Claims, 14 Drawing Sheets

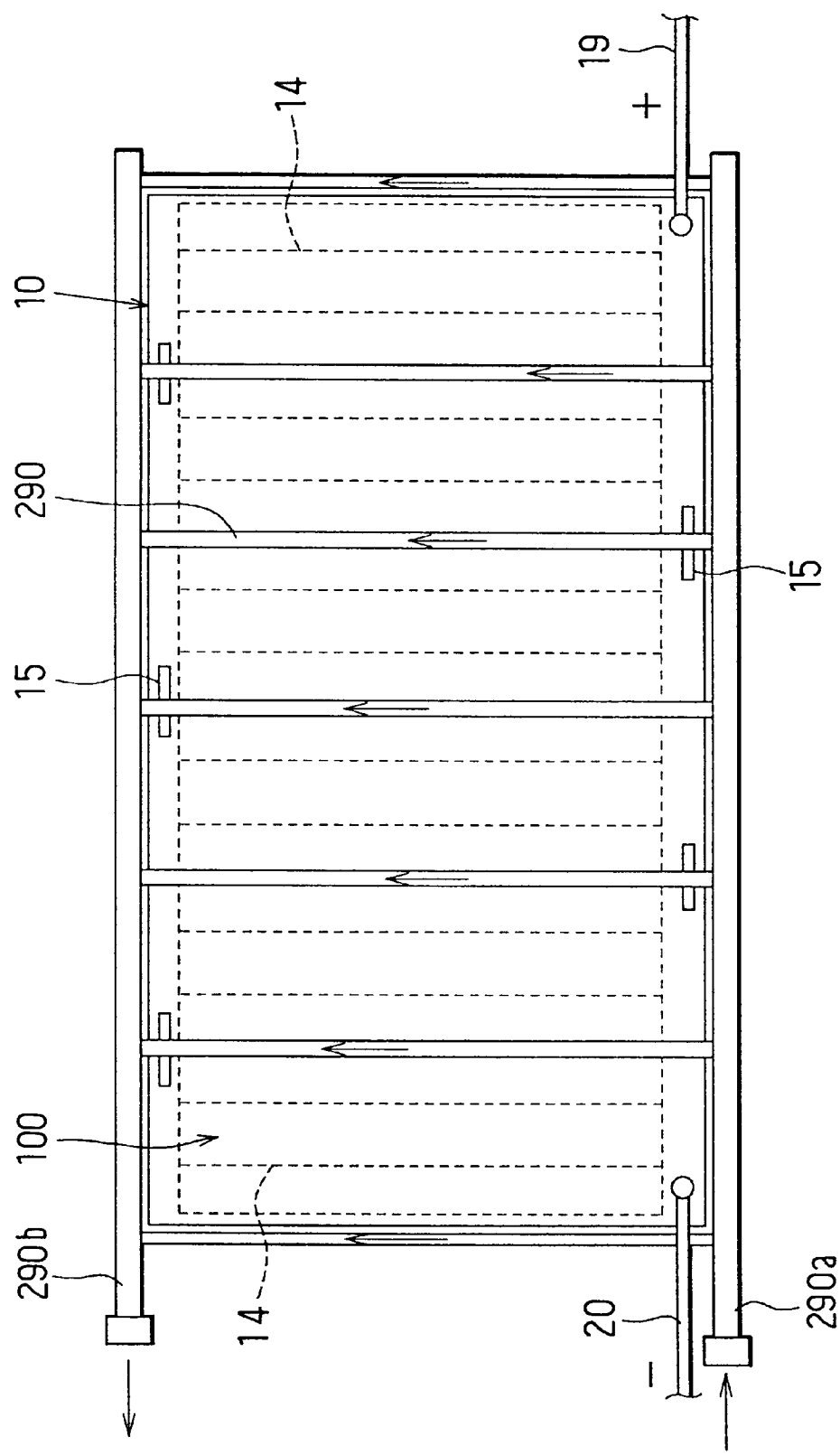

BATTERY COOLING SYSTEM

CROSS REFERENCE TO RELATED APPLICATION

This application is based upon and claims the benefit of priority of the prior Japanese Patent Application No. 9-177402 filed on Jul. 2, 1997, the contents of which are incorporated herein by reference.

BACKGROUND OF THE INVENTION

1. Field of the Invention

The present invention relates to a cooling system for a battery (storage battery), which is installed in a vehicle such as a hybrid powered vehicle.

2. Related Arts

A battery used as an electric source for an electric vehicle or a hybrid powered vehicle is required to have high voltage and large capacity. Because of this, the battery is generally composed of a plurality of cells electrically connected with one another in series. This type of battery is referred to as a unit battery.

In the unit battery, however, heat can be developed not only by chemical reactions but also by Joule loss caused during charge and discharge cycles in each cell, resulting in increase in temperature of the unit battery. The increase in temperature advisory affects a battery life and other battery properties. Therefore, various kinds of battery cooling systems are proposed to solve the above problem.

For example, JP-A-8-222280 proposes a heat pipe having an evaporation part at an end thereof and a condensation part at the other end thereof. The evaporation part is inserted into an airtight casing accommodating a plurality of cells therein, while the condensation part protrudes from the airtight casing upward. The heat pipe retains coolant liquid therein. The coolant liquid retained in the evaporation part absorbs heat developed by the cells so that it evaporates and changes into coolant gas. Then the coolant gas rises to the condensation part and loses the heat in the condensation part so that it is condensed to return into liquid state again. At that time, the heat is transmitted from the coolant gas to the outside air.

However, in the unit battery using the heat pipe, there easily arises variation in temperature within the airtight casing. Specifically, in the airtight casing, the cooling effect at a portion apart from the evaporation part of the heat pipe is smaller than that at a portion adjacent to the evaporation part, resulting in the variation in temperature in the airtight casing of the unit battery. If the unit battery has the variation in temperature in the airtight casing, capacities of the cells disposed at a higher temperature part, i.e., at the portion apart from the evaporation part of the heat pipe, are suddenly decreased as the charge and discharge cycles progress compared to those disposed at a lower temperature part. In some kinds of batteries, cells degraded to some extent may generate inflammable hydrogen gas.

SUMMARY OF THE INVENTION

The present invention has been made in view of the above-mentioned problems. An object of the present invention is to provide a battery cooling system capable of uniformly cooling down a plurality of battery cells held in an airtight casing. Another object of the present invention is to provide a battery cooling system with a small size. Still another object of the present invention is to provide a battery cooling system capable of providing a high cooling property.

Briefly, a battery cooling system according to the present invention has an airtight casing holding a battery cell in an inside space thereof and a cooling apparatus communicating with the inside space of the airtight casing. The inside space of the airtight casing and the cooling apparatus are filled with coolant. The coolant absorbs heat developed by the battery cell in the inside space so that it evaporates, and the evaporated (gaseous) coolant moves into the cooling apparatus and is cooled by the cooling apparatus to be condensed. The condensed (liquid) coolant returns to around the battery cell.

In the battery cooling system, because the coolant can contact the entire surface of the battery cell in the inside space of the airtight casing, the battery cell can be uniformly and efficiently cooled down. Even if the airtight casing holds a plurality of battery cells therein, the battery cells are uniformly and efficiently cooled down not to have variation in temperature therein. Preferably, the cooling apparatus is disposed on an upper side of the battery cell. The cooling apparatus may be disposed either one of inside and outside of the airtight casing. When the cooling apparatus is provided inside of the airtight casing, the size of the battery cooling system can be reduced. The cooling apparatus can utilize a cooling pipe in which low temperature refrigerant of an air conditioning refrigerating cycle. In this case, the evaporated coolant is cooled down in the cooling apparatus by exchanging heat with the low temperature refrigerant.

The cooling apparatus need not always include a member communicating with the inside space of the airtight casing. For example, when the airtight casing holding the battery cell is disposed with a longitudinal direction approximately parallel to a horizontal direction, the cooling apparatus can be disposed on an upper outside of the airtight casing in a vertical direction to contact the upper wall. In this case, the upper wall of the airtight casing is cooled, and the coolant evaporated by the heat around the battery cell is cooled by contacting the upper wall of the airtight casing within the inside space of the airtight casing. In this case, the space for installing the cooling apparatus can be reduced, and simultaneously the sealing property of the airtight casing is enhanced. The cooling apparatus may be composed of only a cooling pipe in which low temperature fluid flows. In this case, a part of the cooling pipe is disposed in the inside space of the airtight casing, resulting in size reduction of the battery cooling system and cost reduction.

BRIEF DESCRIPTION OF THE DRAWINGS

These and other objects and features of the present invention will become more readily apparent from a better understanding of preferred embodiments described below with reference to the following drawings.

FIG. 15 is a top plan view showing a battery unit from which a cover member is removed and a cooling apparatus in a ninth embodiment;

DETAILED DESCRIPTION OF THE PREFERRED EMBODIMENTS

First Embodiment

Figure 1:
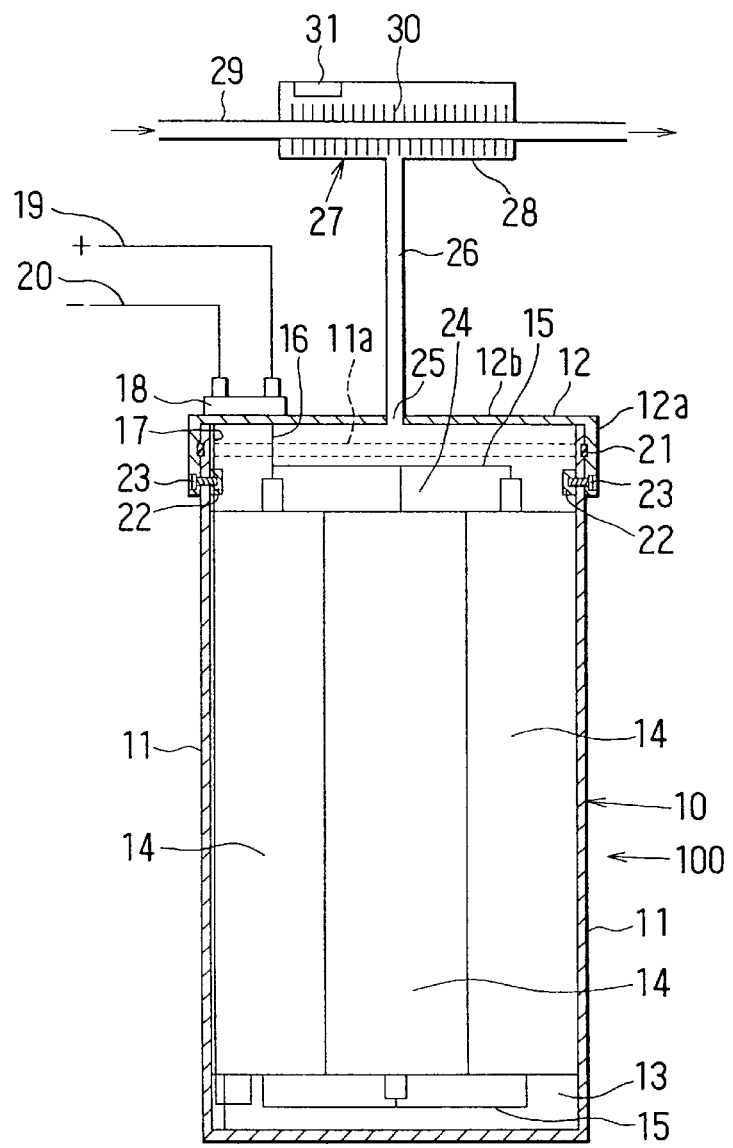
FIG. 1 is a vertical cross-sectional view showing a battery and a cooling apparatus in a first embodiment.

Referring to FIG. 1, a battery 100 in a first preferred embodiment has an airtight casing 10. The airtight casing 10 is composed of a casing body 11 with an opening portion and a casing cover 12 for covering the opening portion of the casing body 11. The casing body 11 and the casing cover 12 are made of metal or resin.

Figure 2:
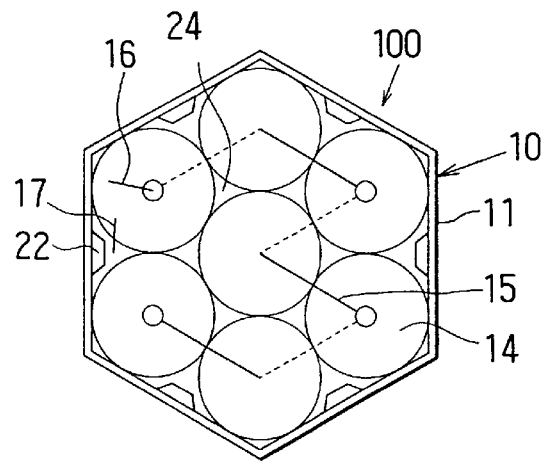
FIG. 2 is a top plan view showing the battery of FIG. 1 from which a casing cover is removed.

A support base 13 made of insulating material is disposed in a bottom portion of the casing body 11. The support base 13 has a hexagonal shape corresponding to the shape defined by the inner walls of the casing body 11. As shown in FIG. 2, a plurality of, specifically seven in this embodiment, cylindrical cells (battery cells) 14 are disposed on the support base 13 within the casing body 11. The seven cells 14 are electrically connected to one another in series through electrical wires 15, and are electrically insulated from the casing 10.

An end of the connected cells 14 is connected to a positive side output wire 16, while the other end of the connected cells 14 is connected to a negative side output wire 17. Both of the output wires 16, 17 are respectively connected to outer wires 19, 20 via a sealing terminal 18 hermetically attached to the casing cover 12. Electrical power produced by the cells 14 is taken out through the outer wires 19, 20. Each of the cells 14 is a rechargeable secondary cell (shortage cell), specifically a nickel-hydrogen cell. When the temperature in the casing 10 of the battery 100 is not so high, e.g., lower than 45° C., the nickel-hydrogen cells can keep an inside pressure of the casing 10 at an atmospheric pressure by absorbing heat developed in the casing 10.

The above-mentioned casing cover 12 has an upper part 12b and a hexagonal prism like engaging part 12a integrally and perpendicularly connected to the peripheral portion of the upper part 12b. The engaging part 12a is hermetically fitted to the outer side wall of the casing body 11 via a seal member 21. The seal member 21, which is an O-shaped ring made of elastic material such as rubber in this embodiment, is held in a groove 11a formed on the outer side face of the casing body 11 and is compressed by the engaging part 12a. The engaging part 12a of the casing cover 12 are further bolted to the casing body 11. Specifically, referring to FIG. 2, six boss parts 22 is formed on the inner side wall of the casing body 11 with a constant interval. Further, attachment holes for receiving bolts (fixing members) 23 are respectively formed in the engaging part 12a of the casing cover 12 and the casing body 11 at the six portions corresponding to the boss parts 22. Then the bolts 23 are tightened in the attachment holes. Accordingly, the casing cover 12 is hermetically fixed to the casing body 11.

In the inside space 24 of the casing 10, the cylindrical cells 14 are disposed with a staggered arrangement in cross-section as shown in FIG. 2. The inside space 24 is not completely divided by the cylindrical cells 14. That is, spaces surrounded by the cells 14 communicate with one another as the integrally communicating inside space 24 within the casing 10. The upper part 12b of the casing cover 12 has an opening 25 at the central portion thereof, and a thermal siphon type cooling apparatus 27 is disposed above the casing 10 to communicate with the inside space 24 of the casing 10 through a communicating pipe 26 and the opening 25. The inside space 24 of the casing 10, the cooling apparatus 27, and the communicating pipe 26 constitute a coolant circulating system passage, and the coolant circulating system passage is filled with coolant serving as working fluid for the cooling apparatus 27. Incombustible coolant with a high boiling point such as fluoro carbon can be used for the cooling apparatus 27. The casing body 11 has a coolant filling port (not shown) for pouring the coolant into the casing body 11.

The communicating pipe 26 is made of resin or metal such as aluminum. The cooling apparatus 27 has a cylindrical casing 28, which is also made of resin or metal such as aluminum and is disposed with an axis approximately perpendicular to the axis of the casing 10 of the battery 100. The casing 28 communicates with the communicating pipe 26 at the central portion in the axial direction thereof.

A cooling pipe 29 passes through the casing 28 in the axial direction of the casing 28. The cooling pipe 29 is a low pressure side refrigerant pipe in a refrigerating cycle of an automotive air conditioning apparatus (not shown), and low temperature refrigerant on the low pressure side in the cycle flows in the cooling pipe 29. For example, a cooling pipe provided between pressure reducing means such as an expansion valve and an evaporator on an inlet side or between the evaporator on an outlet side and an accumulator on an inlet side can serve as the cooling pipe 29. The accumulator serves as a gas-liquid separator of refrigerant which is inhaled into a compressor.

The cooling pipe 29 is made of metal such as aluminum having sufficient thermal conductivity and corrosion resistance. On the outer circumferential surface of the cooling pipe 29, plate-like fin members 30 are disposed to facilitate the thermal transmittance between the cooling pipe 29 and the coolant inside the casing 28. The fin members 30 are made of metal such as aluminum as well. Further, a gas absorbing device 31 for selectively trapping small diameter molecules such as hydrogen gas is disposed on an upper side within the casing 28. The absorbing device 31 can utilize zeolite or the like.

Next, operations and effects of the battery 100 and the cooling apparatus 27 in the first embodiment will be explained. When the cells 14 are discharged, the temperature in the airtight casing 10 rises due to Joule-loss and the like. As soon as the temperature in the casing 10 rises, coolant retained in the inside space 24 of the casing 10 absorbs heat from the cells 14 until it boils to be gasified. Accordingly, the cells 14 are cooled by evaporation latent heat of the coolant. At that time, because each of the cells 14 directly contacts the coolant on the entire outer surface thereof in the inside space 24, the cells 14 are efficiently and uniformly cooled, thereby minimizing variation in temperature among the cells 14.

The gaseous coolant in the casing 10 rises in the communicating pipe 26 due to natural convection caused by decrease in density of the coolant in the casing 10, and flows into the cylindrical casing 28 of the cooling apparatus 27. The gaseous coolant is cooled in the casing 28 due to heat exchange with the low temperature refrigerant flowing in the cooling pipe 29 so that it is condensed and changed into a liquid state. The liquid coolant descends in the communicating pipe 26 due to increase in density thereof, i.e., by its self-weight, and returns into the inside space 24 of the airtight casing 10. The coolant can be repeatedly used for cooling the cells 14.

As mentioned above, incombustible high boiling point coolant such as fluoro carbon can be used as the coolant for the thermal siphon type cooling apparatus 27 in this embodiment. In this case, because the working pressure (working fluid pressure) inside the casing 10 can be reduced, the mechanical strength required for the casing 10 can be decreased in design, resulting in low cost. Specifically, fluoro carbon has a working pressure generally in a range of 90 kPa–200 kPa which is around an atmospheric pressure and a boiling point of approximately 30° C. at the pressure. In addition, the coolant such as fluoro carbon is incombustible, so that safety of the battery 100 is more improved.

In this embodiment, the low temperature refrigerant in the refrigerating cycle for the air conditioning apparatus is used as coolant flowing in the cooling pipe 29 of the cooling apparatus 27. Therefore, there arises a large difference in temperature between the low temperature refrigerant in the cooling pipe 29 and the high temperature gaseous coolant in the casing 28. As a result, the cooling apparatus 27 provides a large condensing property with respect to the gaseous coolant. Because of this, the cooling apparatus 27 need not have a large size and the cooling pipe 29 need not meander or be bent in the casing 28. In the first embodiment, although the cooling pipe 29 is a straight circular tube, it may be a flat tube.

Because the cooling pipe 29 does not meander or is not bent in the casing 28, refrigerant pressure loss on the low pressure side of the air conditioning refrigerating cycle can be minimized, thereby preventing decrease in refrigerating cycle efficiency. In addition, when the automotive air conditioning refrigerating cycle is used as a heat pump, because the refrigerant absorbs heat in the cooling apparatus 27, the heating property of the heat pump is enhanced.

On the other hand, the battery 100 has a safety valve for releasing hydrogen gas from the casing 10 when the inside pressure of the battery 100 increases to a specific pressure due to a large amount of gas generated by the overcharged cells 14. However, in this embodiment, because the cooling apparatus 27 has the gas absorbing device 31 for selectively trapping small diameter molecules such as hydrogen gas, the pressure inside of the casing 10 of the battery 100 can be prevented from rising to the specific pressure capable of opening the safety valve. The gas absorbing device 31 may be disposed on the inside wall of the casing cover 12.

Second Embodiment

Figure 3:
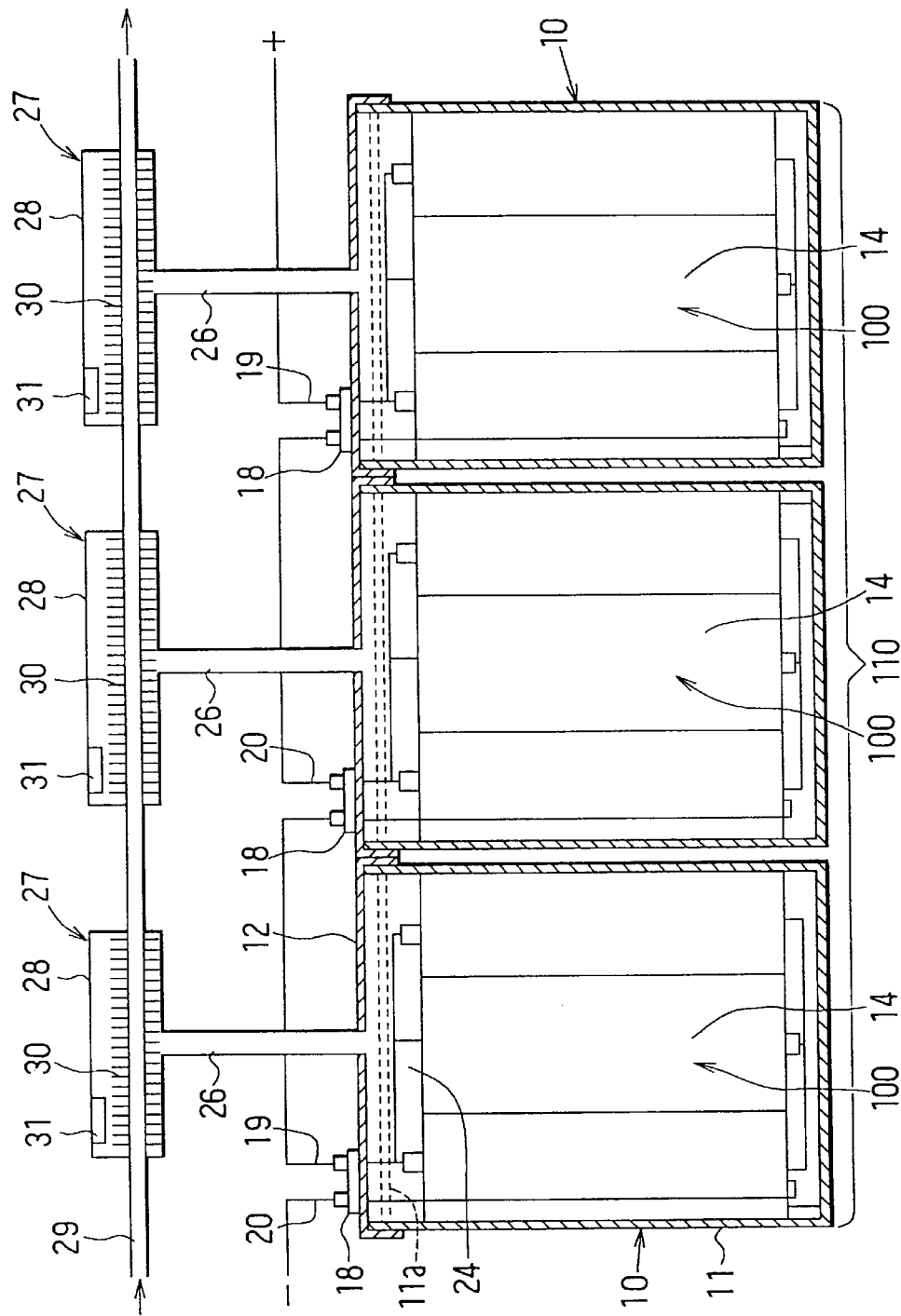
FIG. 3 is a vertical cross-sectional view showing a battery unit and cooling apparatuses in a second embodiment.

In a second preferred embodiment, as shown in FIG. 3, a plurality of batteries 100 having the same structure as in the first embodiment are united. That is, in the second embodiment, the plurality of batteries 100 are disposed in line in a horizontal direction, and respective outer wires 19, 20 of the batteries 100 are connected to one another so that the batteries 100 are electrically connected in series, thereby constituting a battery unit 110. In the following embodiments, the same parts and components as in the first embodiment are indicated with the same reference numerals and the same descriptions will not be reiterated.

Generally, an electric vehicle requires a large number of in-series connected cells to provide high voltage and large capacity. In the second embodiment, the required large number of cells are divided into several groups, and each of the groups is retained in one of the batteries 100. In this embodiment, each group includes seven cells 14 as described in the first embodiment. Further, each of the batteries 100 has the cooling apparatus 27 with the gas absorbing device 31. Accordingly, increase in temperature of each battery is prevented, whereby increase in temperature of the battery unit 110 is prevented. In addition, hydrogen gas produced in each battery 100 is trapped by each gas absorbing device 31 without being released in the battery unit 110. The other features and effects in the second embodiment are the same as those in the first embodiment.

Third Embodiment

Figure 4:
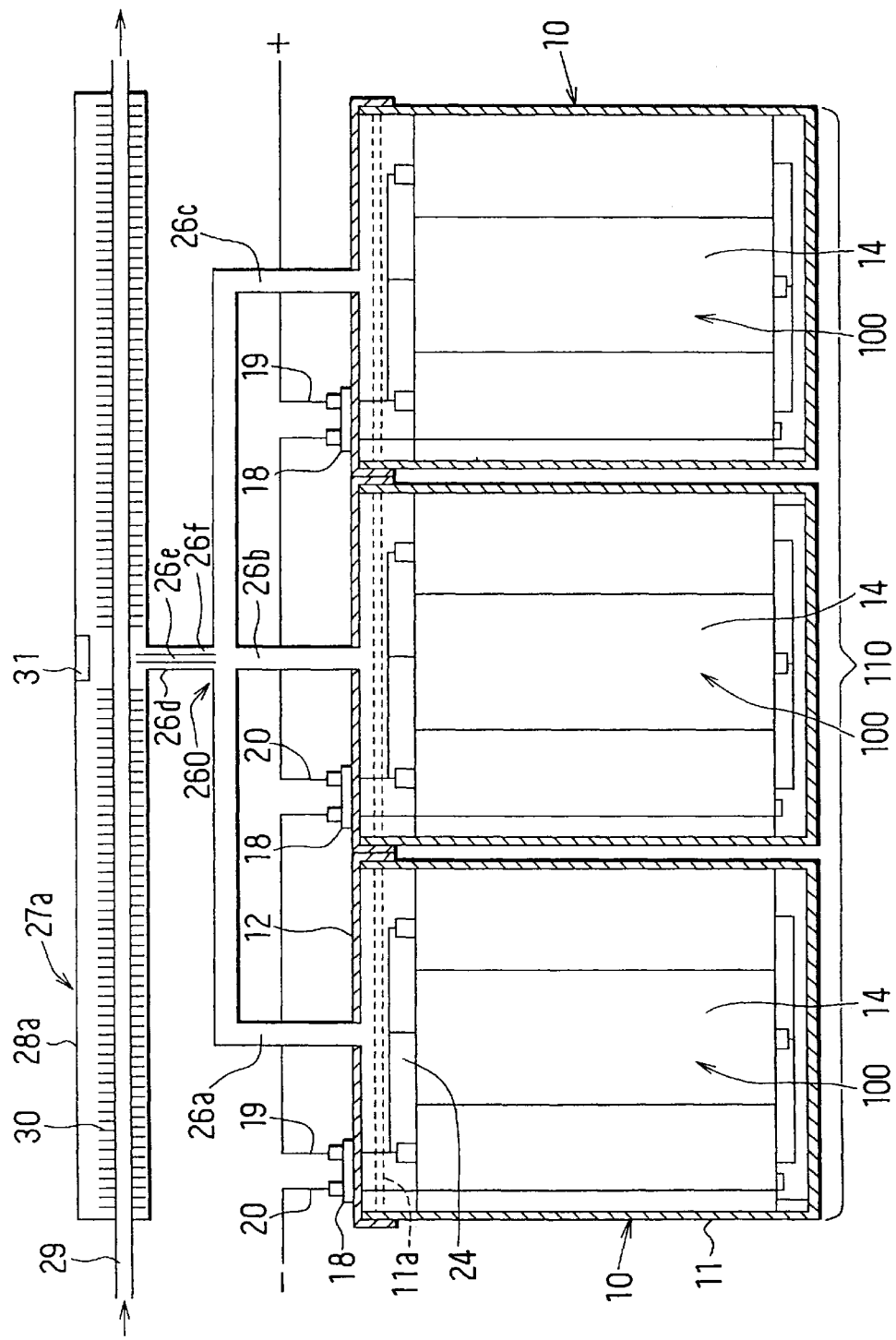
FIG. 4 is a vertical cross-sectional view showing a battery unit and a cooling apparatus in a third embodiment.

In a third preferred embodiment, as shown in FIG. 4, a battery unit 110 composed of a plurality of, three in this embodiment, batteries 100 has a common cooling apparatus 27a. The cooling apparatus 27a has a communicating pipe 26 composed of a plurality of branch pipes 26a–26c respectively communicating with the inside spaces 24 of the batteries 100. The communicating pipe 260 further has a double-tube portion 26d at a junction of the branch pipes 26a–26c, and the double-tube portion 26d communicates with inside of a casing 28a of the cooling apparatus 27a at the central portion in an axial direction of the casing 28a. Gaseous coolant evaporated in airtight casings 10 of the batteries 100 passes through the branch pipes 26a–26c and rises in an inner tube of the double-tube portion 26d. Then, after the gaseous coolant is condensed to be liquid coolant in the casing 28a of the cooling apparatus 27a, the liquid coolant descents in an outer tube of the double-tube portion 26d. This is because the inner tube of the double-tube part 26 protrudes on both ends thereof from the outer tube as shown in FIG. 4.

Thus the gaseous coolant and the liquid coolant respectively flow in the different tubes of the double-tube portion 26d. Therefore, even when a large amount of coolant is evaporated around the cells 14 in the batteries 100, the gaseous coolant rising in the inner tube of the double-tube part 26d does not disturb the liquid coolant descending in the outer tube of the double-tube part 26d. Consequently, circulation of the coolant is smoothly conducted, resulting in improvement of the cooling property of the cooling apparatus 27a.

The gas absorbing device 31 is disposed on an upper inside wall of the casing 28a to face the opening end of the double-tube portion 26d of the communicating pipe 26. Accordingly, the gas absorbing device 31 efficiently traps hydrogen gas which is included in the gaseous coolant discharged from the inner tube of the double-tube portion 26d. Only the one gas absorbing device 31 is sufficient for the cooling apparatus 27a. The other features and effects are the same as those in the first and second embodiments.

Fourth Embodiment

Figure 5:
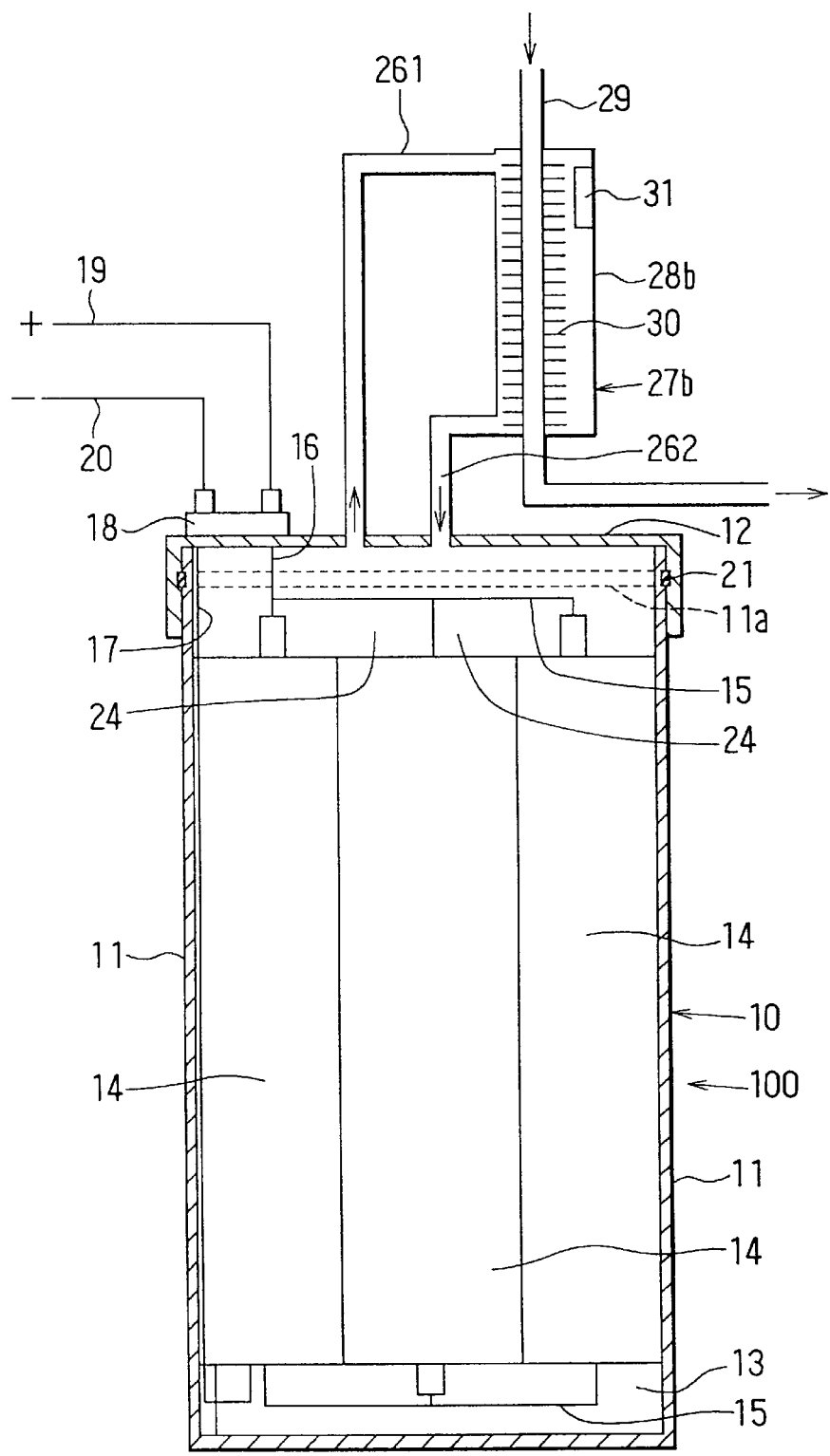
FIG. 5 is a vertical cross-sectional view showing a battery and a cooling apparatus in a fourth embodiment.

In a fourth preferred embodiment, as shown in FIG. 5, a cooling apparatus 27b is vertically with an axis approximately parallel to the axis of the casing 10 of the battery 100. The casing 28b of the cooling apparatus 27b communicates with the inside space 24 of the casing 10 of the battery through a gas side communicating pipe 261 and a liquid side communicating pipe 262, both of which are connected to the casing cover 12 of the battery 100. The gas side communicating pipe 261 is connected to the upper end of the casing 28b to transport gaseous coolant from the casing 10 of the battery 100 into the casing 28b of the cooling apparatus 27b, while the liquid side communicating pipe 262 is connected to the lower end of the casing 28b to transport liquid coolant from the casing 28b into the casing 10.

That is, in the fourth embodiment, the casing 10 of the battery, the gas side communicating pipe 261, the casing 28b of the cooling apparatus 27b, and the liquid side communicating pipe 262 cooperatively constitute a loop-like passage in which the coolant circulates, so that the circulation of the coolant is more smoothly conducted than the third embodiment, resulting in high cooling property of the cooling apparatus 27b. The gas absorbing device 31 is disposed in the casing 28b to face the opening end of the gas side communicating pipe 261, so that it efficiently traps hydrogen gas. The other features and effects are the same as those in the first embodiment.

Fifth Embodiment

Figure 6A:
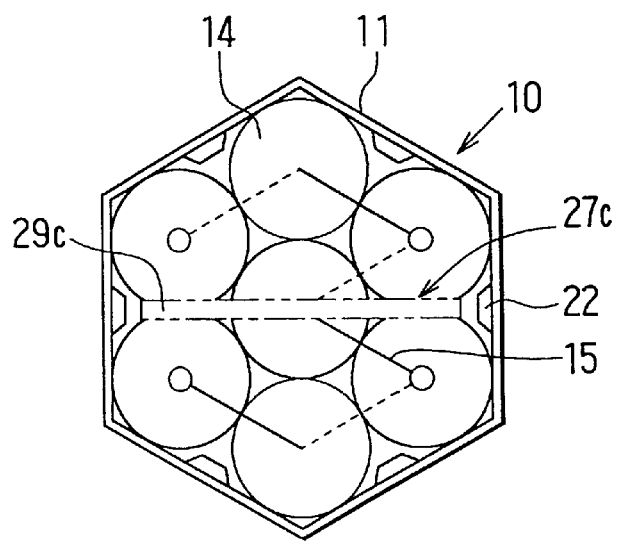
FIG. 6A is a top plan view showing a battery from which a casing cover is removed in a fifth embodiment.
Figure 6B:
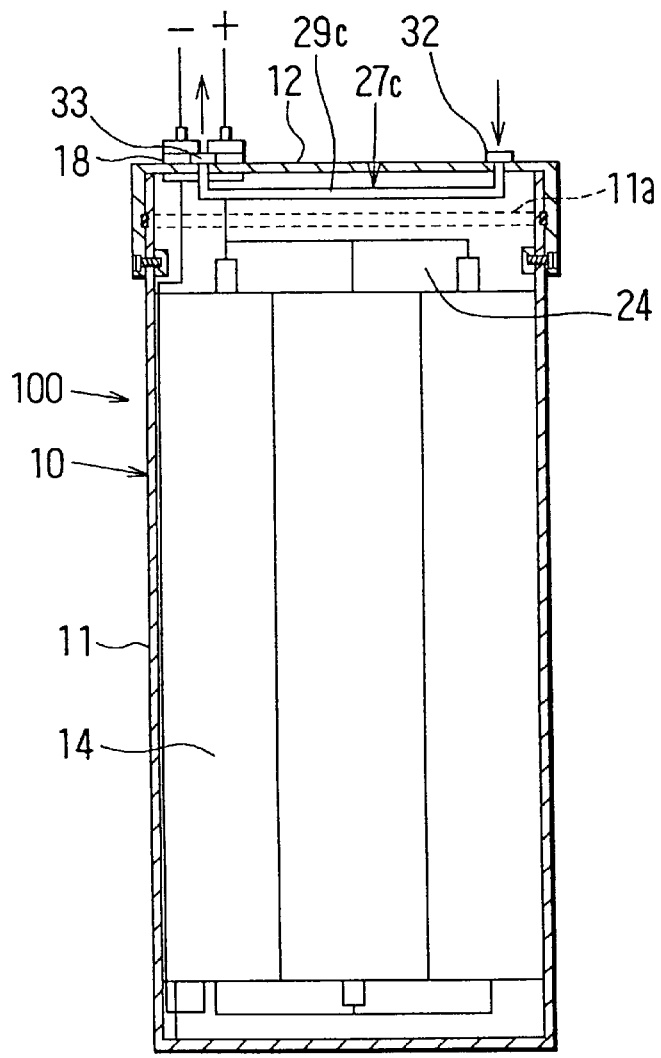
FIG. 6B is a vertical cross-sectional view showing the battery with the casing cover and a cooling apparatus in the fifth embodiment.

In a fifth preferred embodiment, as shown in FIGS. 6A, 6B, a cooling apparatus 27c is disposed within the casing 10 of the battery 100, thereby realizing size reduction of the cooling apparatus 27c.

Specifically, a cooling pipe 29c of the cooling apparatus 27c is directly disposed inside of the casing cover 12 of the casing 10. The cooling pipe 29c is an aluminum pipe disposed on a low pressure side of a refrigerating cycle of an automotive air conditioning apparatus, and low temperature refrigerant flows in the cooling pipe 29c. Inlet side coupling member 32 and outlet side coupling member 33 are hermetically disposed on the casing cover 12. The cooling pipe 29c is suspended from the inner wall of the casing cover 12 with both ends thereof integrally joined to the coupling members 32, 33. Although FIGS. 6A, 6B do not indicate, the fin members 30 can be disposed on the surface of the cooling pipe 29c. Likewise, the gas absorbing device 31 for trapping hydrogen gas can be disposed on the inner wall of the casing cover 12.

Figure 7:
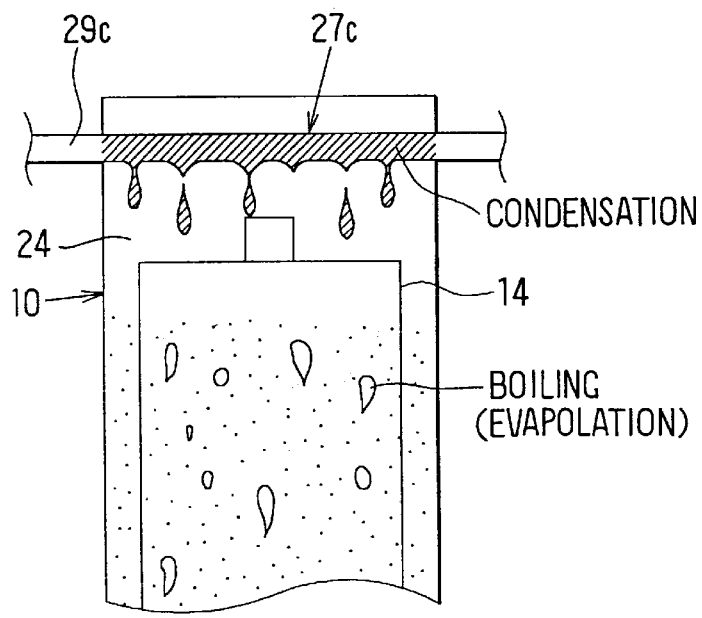
FIG. 7 is a schematic view for explaining a cooling mechanism in the fifth embodiment.

Next, the cooling mechanism in the fifth embodiment will be explained referring to FIG. 7. The inside space 24 of the casing 10 is filled with high boiling point coolant such as fluoro carbon, and the coolant evaporates (boils) by heat developed by the cells 14 to be gasified. The gaseous coolant flows upward in the inside space 24 due to natural convection caused by decrease in density of the coolant, reaches the cooling pipe 29c of the cooling apparatus 27c disposed in the upper portion of the inside space 24, and is cooled by heat exchange with the low temperature refrigerant flowing in the cooling pipe 29c so that it is condensed to be liquid. The liquid coolant descends downward due to its self-weight, and is used for cooling the cells 14 again. Thus, the coolant boils (evaporates) around the cells 14, and is condensed in the upper portion of the inside space 24.

Sixth Embodiment

Figure 8:
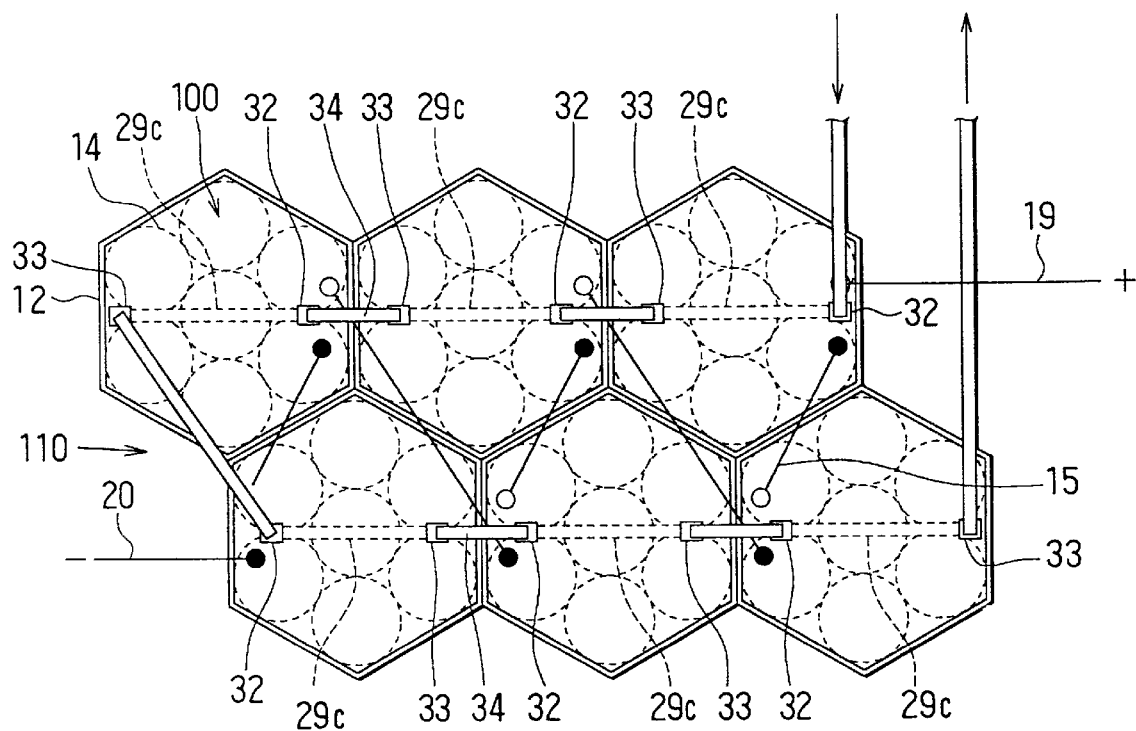
FIG. 8 is a top plan view showing a battery unit in a sixth embodiment.
Figure 9:
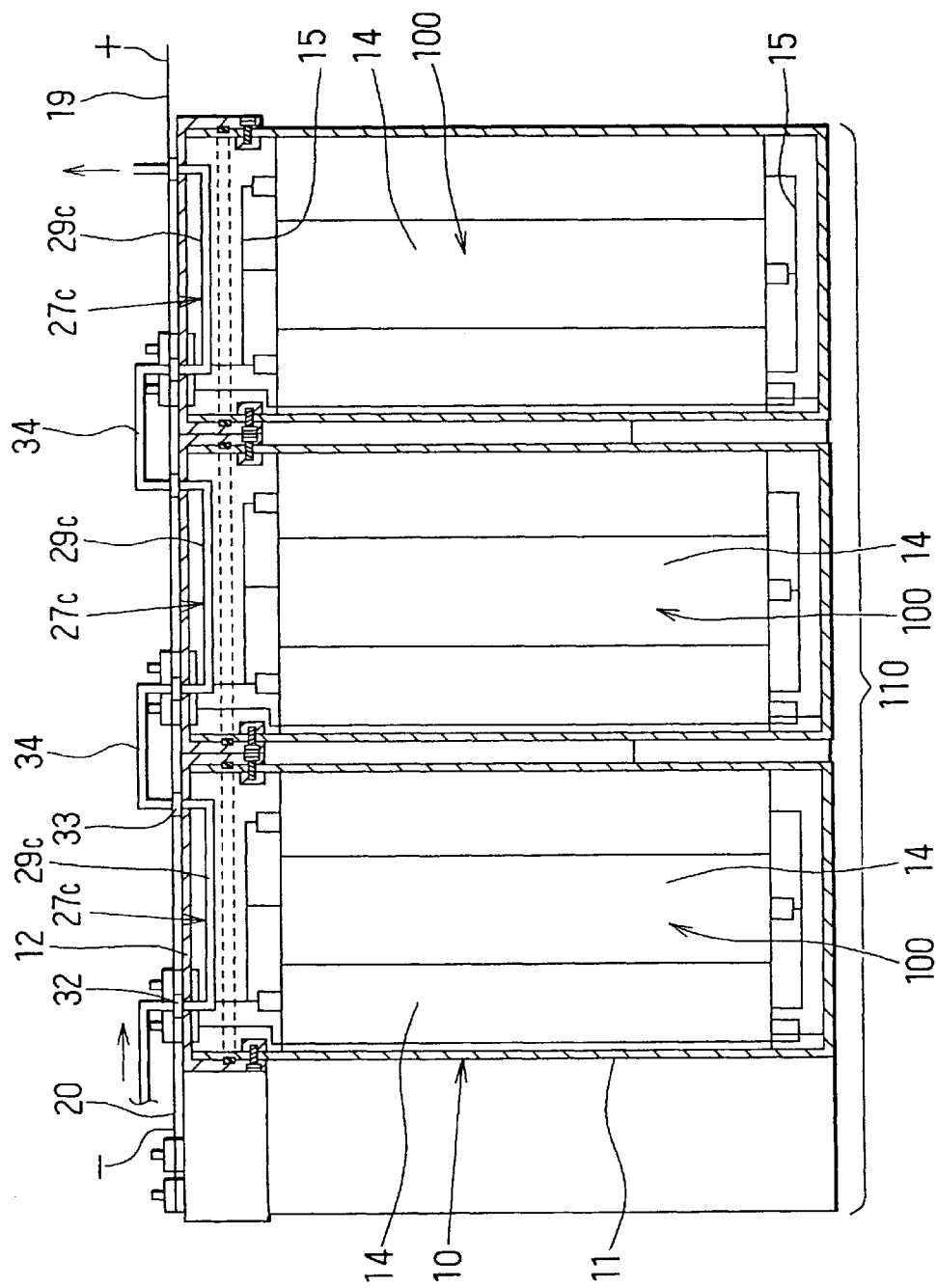
FIG. 9 is a side view showing the battery unit in the sixth embodiment.

In a sixth preferred embodiment, as shown in FIGS. 8, 9, a plurality of batteries 100 respectively holding cooling apparatuses 27c in the fifth embodiment are united as a battery unit 110. Connecting pipes 34 made of aluminum respectively connect the inlet side coupling member 32 of one of the cooling pipes 29c disposed in a battery 100 and the outlet side coupling member 33 of another cooling pipe 29c disposed in another battery 100 as shown in FIG. 8. Accordingly, the cooing pipes 29 are connected to one another in series by the connecting pipes 34. The other features and effects are the same as those in the above-mentioned embodiments.

Seventh Embodiment

In the first to sixth embodiments, the cooling apparatus utilizes the low temperature refrigerant in the air conditioning refrigerating cycle. As opposed to this, a seventh preferred embodiment adopts an air cooling type cooling apparatus 27d.

Figure 10:
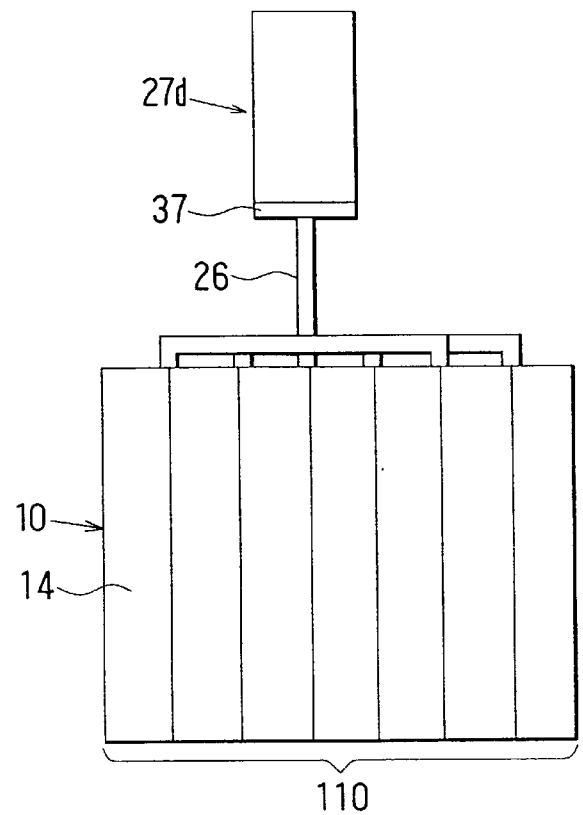
FIG. 10 is a front view showing a battery unit and a cooling apparatus in a seventh embodiment.
Figure 11:
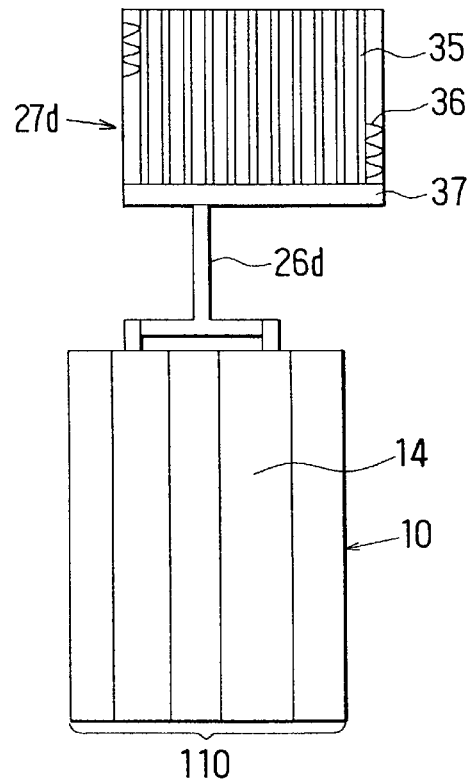
FIG. 11 is a side view showing the battery unit and the cooling apparatus in the seventh embodiment.

Referring to FIGS. 10, 11, the cooling apparatus 27d is composed of a plurality of flat tubes 35 vertically disposed in parallel with one another, and corrugated fins 36 respectively disposed between adjacent two of the flat tubes 35. The lower ends of the flat tubes 35 communicate with a horizontally extending header tank 37. The flat tubes 35, the corrugated fins 36, and the header tank 37 are made of aluminum and are blazed to one another.

Figure 12:
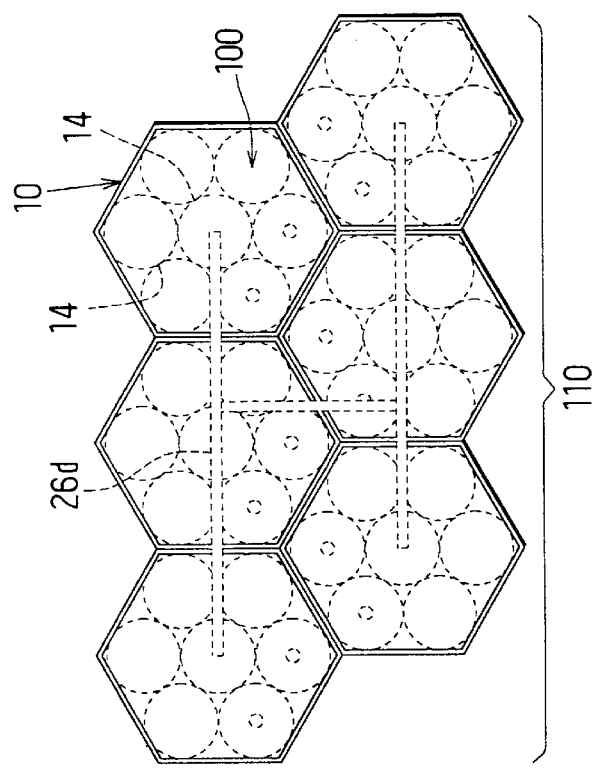
FIG. 12 is a top plan view showing the battery unit from which the cooling apparatus is removed in the seventh embodiment.

The cooling apparatus 27d is disposed above the battery 100 and the header tank 37 disposed at the lower end of the cooling apparatus 27d and the inside space 24 of the battery 100 communicate with each other through the communicating pipe 26d. As shown in FIGS. 11, 12, when a plurality of batteries 100 are united as a battery unit 110, the communicating pipe 26d has branch pipes as in the third embodiment. FIG. 12 shows an arrangement of the communicating pipe 26d when the battery unit 110 is composed of six batteries 100 arranged in two lines.

A blowing device such as an electrically-driven blower (not shown) blows air toward the cooling apparatus 27d. Accordingly, the gaseous coolant flowing in the flat tubes 35 radiates heat into air via the corrugated fins 36 so that it is cooled and condensed. When the battery unit 110 is installed in a vehicle with the cooling apparatus 27d and the cooling apparatus 27d is disposed in an air passage on an upstream side of an evaporator of an automotive air conditioning apparatus, the cooling apparatus 27d can be cooled by air blown by an air conditioning blower. In this case, it is not necessary for the cooling apparatus 27d to specially have the blowing device.

Eighth Embodiment

Figure 13:
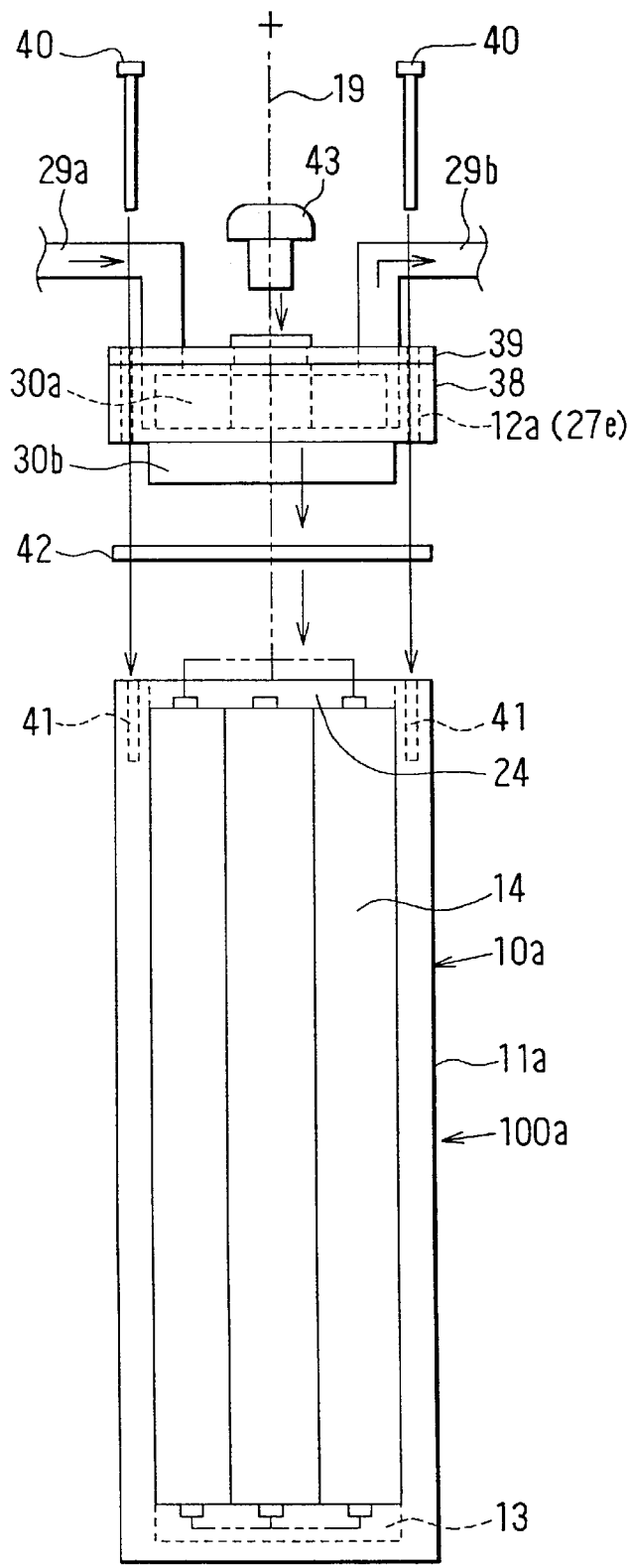
FIG. 13 is an exploded front view showing a battery before it is assembled in an eighth embodiment.
Figure 14:
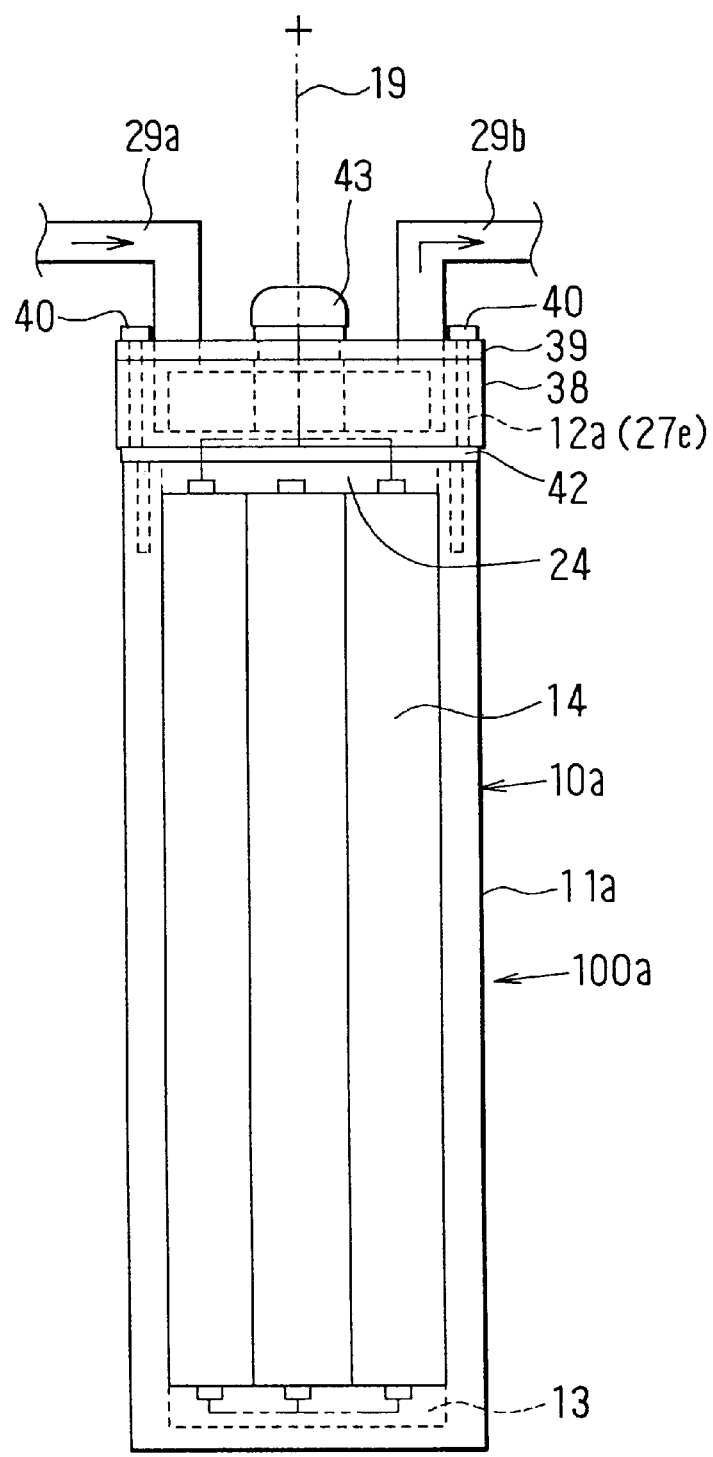
FIG. 14 is a front view showing the battery after it is assembled in the eighth embodiment.

An eighth preferred embodiment is a modified example of the fifth embodiment shown in FIGS. 6A, 6B. Referring to FIGS. 13, 14, in the eighth embodiment, an airtight casing 10a of a battery 100a is composed of a casing body 11a and a casing cover 12a. The casing cover 12a is composed of box-like member 38 with an upper end opening portion and a lid member 39 for covering the opening portion of the box-like member 38, thereby defining a casing cover inside space. The box-like member 38 and the lid member 39 are made of metal having sufficient thermal conductivity such as aluminum and are blazed to each other, so that the casing cover inside space is hermetically provided.

Bolts 40 passing through the lid member 39 and the wall of the box-like member 38 are tightened in threaded holes provided in the wall of the casing body 11a, so that the casing cover 12a are integrally bolted to the casing body 11a. A seal member 42 is interposed between the upper end face of the casing body 11a and the bottom face of the casing cover 12a, thereby providing air tightness between the casing body 11a and the casing cover 12a.

In the casing cover inside space, low temperature refrigerant on a low pressure side of an automotive air conditioning refrigerating cycle flows. Specifically, an inlet side pipe 29a passes through the lid member 39 of the casing cover 12a at a peripheral portion of the lid member 39 to communicate with the casing cover inside space, while an outlet side pipe 29b passes through the lid member 39 at the other peripheral portion of the lid member 39 to communicate with the casing cover inside space as well. Accordingly, in FIGS. 13, 14, the low temperature refrigerant flows in the casing cover inside space from a left side to a right side.

Further, plate-like fin members 30a, 30b are provided on an inner bottom wall and on an outer bottom wall of the box-like member 38 to facilitate thermal exchange between the low temperature refrigerant in the casing cover inside space and gaseous coolant in the inside space 24 of the airtight casing 10a. Accordingly, in the eighth embodiment, the bottom wall of the box-like member 38 and the fin members 30b disposed on the outer bottom wall of the box-like member 38 are cooled by the low temperature refrigerant via the fin members 30a. Then, the gaseous coolant (high boiling point coolant) gasified by absorbing heat developed by the cells 14 rises in the inside space 24 of the airtight casing 10a and contacts the cooled bottom wall of the box-like member 38 and the cooled fin members 30b, so that it is condensed thereon.

That is, in the eighth embodiment, the casing cover 12a of the airtight cover 10a serves as a cooling apparatus 27e. In the battery 100a, a positive side electric wire 19 of the cells 14 is hermetically taken out from the central portion of the casing cover 12a via a plug member 43. A negative side electric wire (not shown) is hermetically taken out from a peripheral portion of the casing cover 12a as well. The negative side electric wire may be taken out from the central portion of the casing cover 12a.

Ninth Embodiment

In the above-mentioned embodiments, the cooling apparatus is applied to the battery unit 110 including a plurality of batteries which are disposed with a longitudinal direction parallel to the vertical direction. As opposed to this, a cooling apparatus in a ninth preferred embodiment is applied to a battery unit 110a including a plurality of batteries which are disposed with a longitudinal direction parallel to the horizontal direction.

Figure 16:
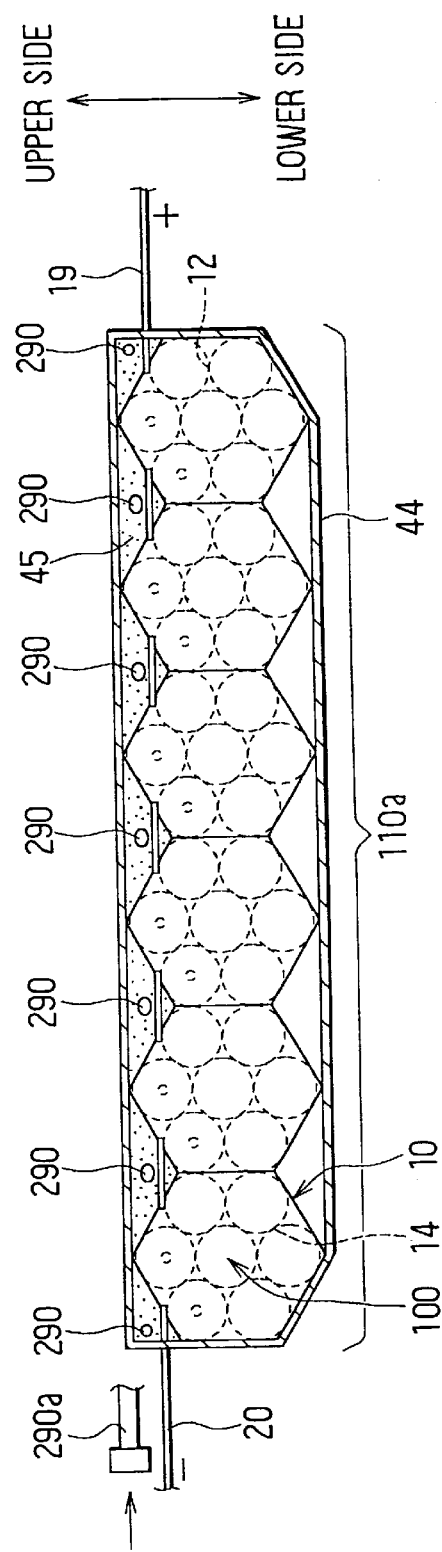
FIG. 16 is a cross-sectional view showing the battery with the cover member and the cooling apparatus in the ninth embodiment.

Referring to FIG. 16, six batteries 100 are disposed in a line with a longitudinal direction parallel to the horizontal direction and are connected to one another, thereby forming the battery unit 110a. The battery unit 110a is entirely covered with a cover member 44 made of resin or metal such that the cover member 44 defines a specific space with each upper face of the airtight covers 10 of the batteries 100. Cooling pipes 290 of the cooling apparatus is disposed in the specific space, and the specific space around the cooling pipes 290 are filled with a thermal conduction member 45 made of insulating material such as ceramic or resin. In FIG. 16, ceramic powdery material fills the specific space as the thermal conduction member 45. In this embodiment, the casing bodies 11 and the casing covers 12 of the airtight casings 10 are made of metal having sufficient thermal conductivity.

Referring to FIG. 15, an inlet side pipe 290a is disposed on an end in the longitudinal direction of the batteries 100, while an outlet side pipe 290b is disposed on the other end in the longitudinal direction of the batteries 10. The several cooling pipes 290 are disposed between the inlet side and outlet side pipes 290a, 290b to be parallel to the longitudinal direction of the batteries 100. The number of the cooling pipes 290 in this embodiment is seven. As in the above-mentioned embodiments, low temperature refrigerant on a low pressure side of an automotive air conditioning apparatus flows from the inlet side pipe 290a to the outlet side pipe 290b through the cooling pipes 290.

Referring again to FIG. 16, the cooling pipes 290 are disposed in recess portions respectively defined by walls of adjacent two batteries 100 not to increase the height of the battery unit 110a. In each battery 100, high boiling point coolant absorbs heat from the cells 14 so that it evaporates, thereby changing into gaseous coolant. The gaseous coolant rises in the inside space 24 of the airtight casing 10 and contacts the upper inside wall of the airtight casing 10. Then, the gaseous coolant is cooled by the low temperature refrigerant flowing in the cooling pipes 290 via the airtight casing 10 made of metal with sufficient thermal conductivity and the thermal conduction member 45, so that it is condensed. The condensed liquid coolant drops by its self-weight, and is used to cool the cells 14 again.

In this way, in the ninth embodiment, the cooling pipes 290 of the cooling apparatus are disposed outside the airtight case 10, and the gaseous coolant is condenses on the upper inside wall of the airtight casing 10. In the ninth embodiment, because the batteries 100 are arranged with a longitudinal direction parallel to the horizontal direction and the cooling pipes 290 elongate along the longitudinal direction of the batteries 100, the lengths of the cooling pipes 290 capable of contacting the gaseous coolant are long, resulting in high cooling efficiency of the cooling apparatus.

Tenth Embodiment

Figure 17:
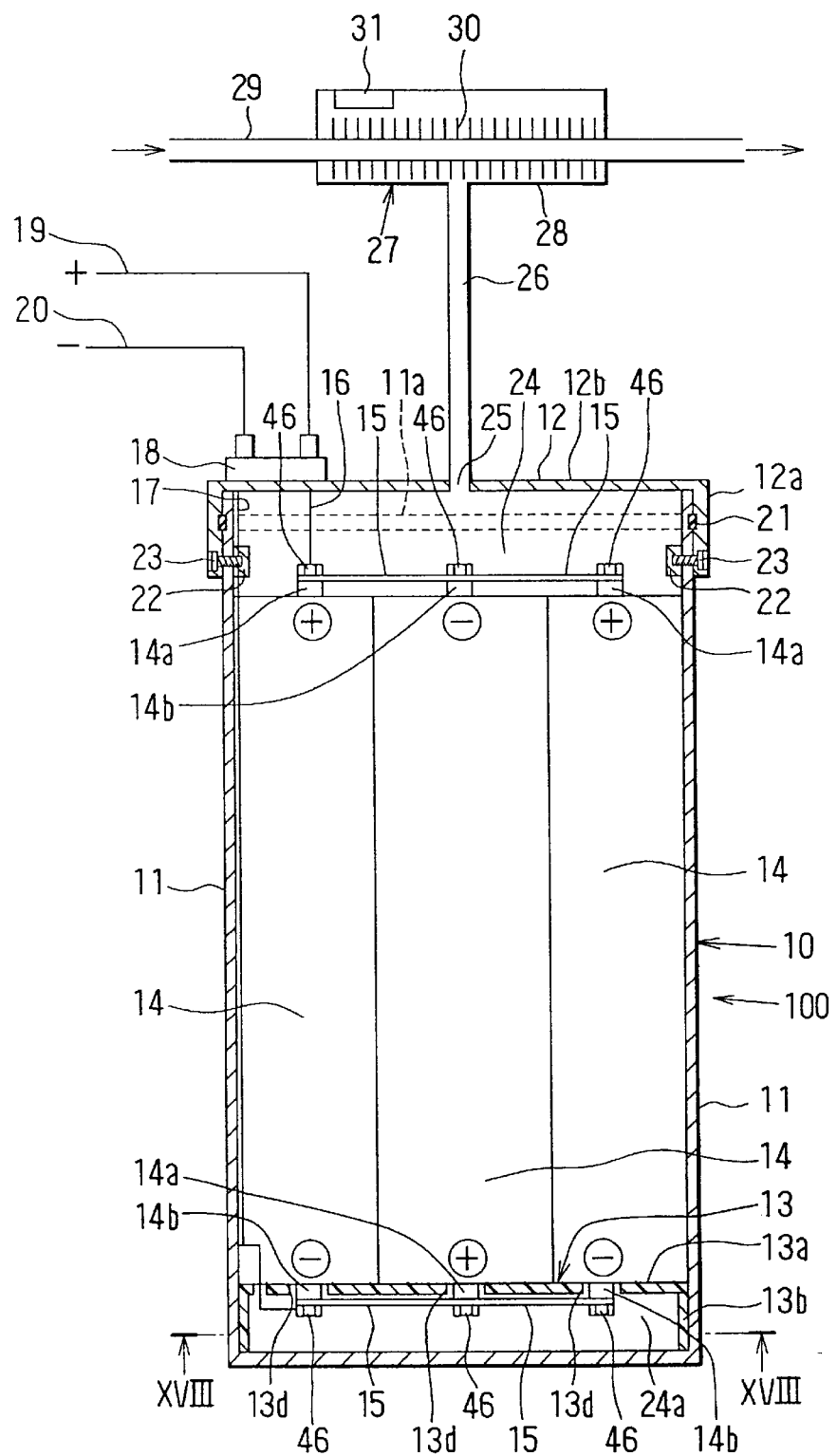
FIG. 17 is a vertical cross-sectional view showing a battery and a cooling apparatus in a tenth embodiment.

A tenth preferred embodiment is a modified example of the first embodiment shown in FIGS. 1, 2. Referring to FIG. 17, in the tenth embodiment, the support base 13 is composed of hexagonal support wall 13a and a hexagonal prism like leg part 13b extending downward from the peripheral portion of the support wall 13a, thereby defining a lower inside space 24a on the lower side of the support wall 13a. A plurality of communication holes 13c are formed in the support wall 13a, so that the inside space (main inside space) 24 on the upper side of the support wall 13a communicates with the lower inside space 24a. Accordingly, the lower inside space 24a is also filled with coolant. The support base 13 is made of insulating material such as resin. The number of the communication holes 13c is twelve in this embodiment.

Figure 18:
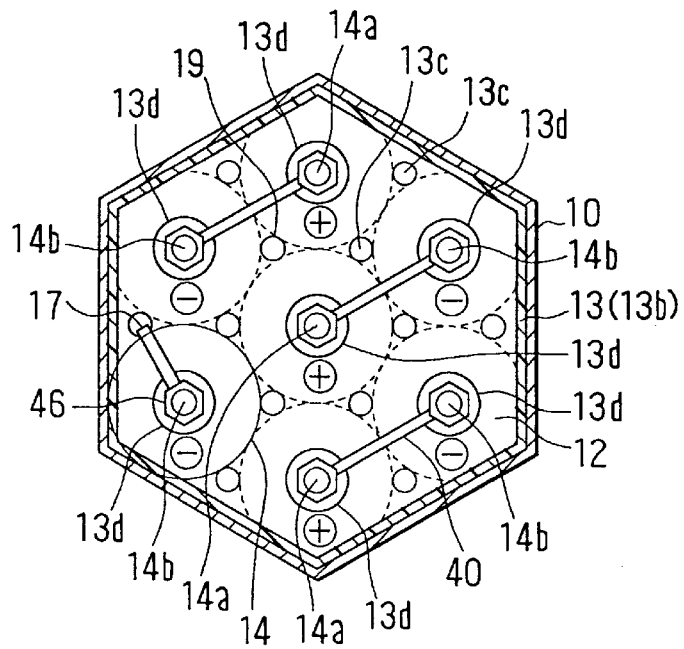
FIG. 18 is a cross-sectional view taken along XVIII—XVIII line in FIG. 17.

In addition, the support wall 13a has through holes 13d in which positive side and negative side terminals 14a, 14b of the cells 14 pass through to protrude toward the lower inside space 24a. Here, as shown in FIGS. 17, 18, the battery 100 includes seven cylindrical cells 14 arranged with a staggered shape so that the cells 14 alternatively have the positive side terminal 14a and the negative side terminal 14b on the upper and lower sides. More specifically, the cells 14 are arranged such that for example on the lower side of the battery 100, one of the cells 14 has the negative side terminals 14b, while the adjacent one has the positive side terminals 14a.

Accordingly, there is no need to connect a lower side terminal to an upper side terminal by an electric wire. It is sufficient the adjacent two cells are connected to one another only on the lower side or only on the upper side as shown in FIG. 18, so that the length of electric wires 15 can be shortened. In addition, some of the electric wires 15 disposed on the lower side are immersed in the coolant within the lower inside space 24a, and are cooled by evaporation latent heat of the liquid coolant within the lower inside space 24a. Therefore, the electric wires 15 are prevented from having a high temperature, so that the diameter of the electric wires 15 can be decreased. In addition, the lengths of the electric wires 15 can be shortened, resulting in low cost. Further, the workability for wiring the electric wires 15 becomes easy.

The coolant evaporated in the lower inside space 24a smoothly flows into the inside space 24 through the communication holes 13c, and in place of the evaporated coolant, the liquid coolant condensed by the cooling apparatus flows from the inside space 24 into the lower inside space 24c through the communication holes 13c. The electric wires 15 are specifically pole-like conductive members in this embodiment, and respectively have ring-like connection parts on the both ends thereof. The ring-like connection parts have through holes (not shown) into which bolts 46 are inserted. Each of the terminals 14a, 14b has a threaded hole (not shown) for receiving corresponding one of the bolts 46. The electric wires 15 are electrically connected to the terminals 14a, 14b of the cells 14 by the bolts 46 passing through the through holes of the ring-like connection parts of the electric wires 15 and tightened in the threaded holes of the terminals 14a, 14b. The other features and effects are the same as those in the first embodiment.

Eleventh Embodiment

Figure 19:
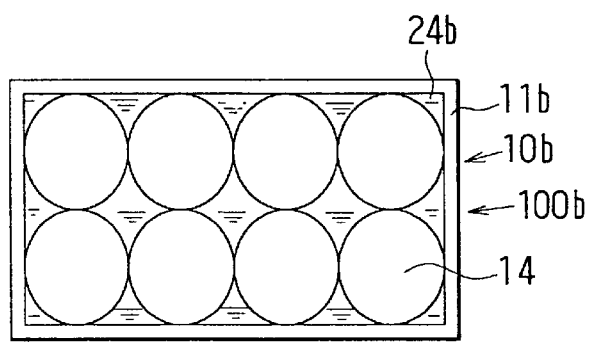
FIG. 19 is a top plan view showing a battery from which a casing cover is removed in an eleventh embodiment.

In an eleventh preferred embodiment, as shown in FIG. 19, a battery 100b has a rectangular parallelopiped airtight casing 10b composed of a casing body 11b and a casing cover 12b. The cylindrical cells 14 are retained in the rectangular parallelopiped airtight casing 10b with a lattice like pattern in cross section. Specifically, as shown in FIG. 19, the airtight casing 10b has a rectangle shape in cross section, and the central points of the cells 14 in cross section are arranged in lines parallel to the shorter and longer sides of the airtight casing 10b. Even in this case, all the cells 14 contacts coolant filling the inside space 24b of the airtight casing 10b on the entire surfaces thereof, so that the cells 14 are efficiently cooled by the coolant.

Twelfth Embodiment

Figure 20:
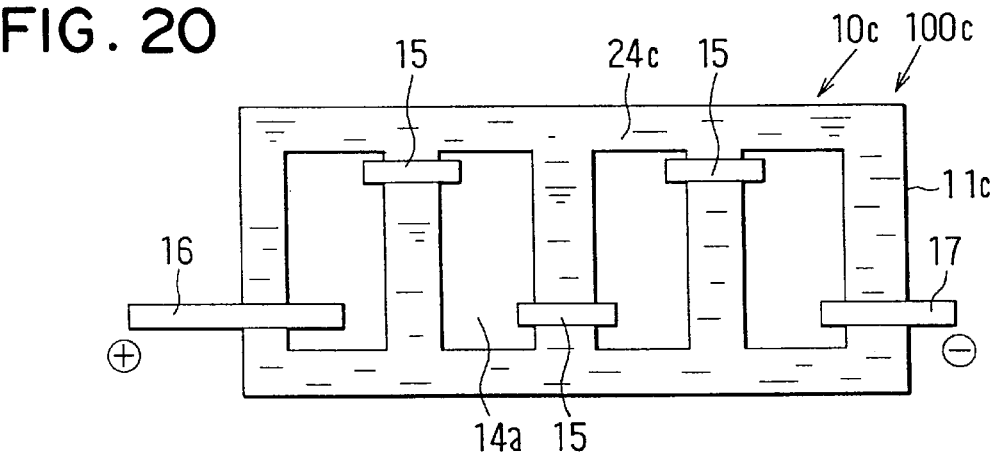
FIG. 20 is a top plan view showing a battery unit from which a casing cover is removed in a twelfth embodiment.

In a twelfth preferred embodiment, a battery 100c has a rectangular parallelopiped airtight casing 10c composed of a casing body 11c and a casing cover as in the eleventh embodiment. Referring to FIG. 20 showing a top plan view of the casing body 11c, rectangular cells 14a are retained in the airtight casing 10c with sufficient intervals therebetween. Accordingly, coolant securely contacts the entire surfaces of the cells 14a, resulting in sufficient cooling effect of the cells 14a. In the twelfth embodiment, because the cells 14 have a rectangular shape in cross section, the cells 14 are arranged in the airtight casing 10c to be apart from one another; however, it is obvious that even if the cells 14 have a cylindrical shape, the cells 14 can be disposed to be apart from one another.

While the present invention has been shown and described with reference to the foregoing preferred embodiments, it will be apparent to those skilled in the art that changes in form and detail may be made therein without departing from the scope of the invention as defined in the appended claims.

For example, in the above-mentioned embodiments, enclosed cells having an airtight casing capable of holding solution therein without any leakage may be used as the cells 14. When the enclosed cells are used, it is not necessary to conduct maintenance processes, for example, for supplying water into the cells. Variations such as those described above are to be understood as being within the scope of the present invention as defined by the appended claims.

What is claimed is:

1. A battery cooling system comprising:

a battery cell for producing electrical energy;

an airtight casing holding the battery cell in an inside space thereof, the inside space being filled with coolant; and a cooling apparatus communicating with the inside space of the airtight casing, the cooling apparatus being filled with the coolant, wherein the coolant contacts the entire surface of the battery cell in the inside space of the airtight casing and absorbs heat developed by the battery cell in the inside space of the airtight casing to evaporate; and wherein the evaporated coolant moves into the cooling apparatus, and is condensed by the cooling apparatus.

2. The battery cooling system of claim 1, wherein the evaporated coolant rises to contact the cooling apparatus, and the condensed coolant descends toward the battery cell.

3. The battery cooling system of claim 1, wherein the cooling apparatus is disposed on an upper side of the battery cell in a vertical direction outside of the airtight casing.

4. The battery cooling system of claim 1, wherein the cooling apparatus has a cooling pipe in which refrigerant used in an air conditioning refrigerating cycle flows.

5. The battery cooling system of claim 1, wherein the coolant is cooled in the cooling apparatus by exchanging heat with air flowing outside of the cooling apparatus.

6. The battery cooling system of claim 1, wherein:

the cooling apparatus communicates with the inside space of the airtight casing through a communicating pipe; and the communicating pipe includes a double-tube part composed of an inner tube for transporting the coolant from the inside space of the airtight casing into the cooling apparatus and an outer tube for transporting the coolant from the cooling apparatus into the inside space of the airtight casing.

7. The battery cooling system of claim 1, wherein:

the cooling apparatus communicates with the inside space of the airtight casing through a communicating pipe; and the communicating pipe has a gas side communicating pipe for transporting the coolant evaporated in the airtight casing and a liquid side communicating pipe for transporting the coolant condensed by the cooling apparatus.

8. The battery cooling system of claim 1, wherein:

the battery cell includes a plurality of battery cells;

the airtight casing includes a plurality of airtight casings, each air tight casing holding a respective battery cell in the inside space, the plurality of battery cells being electrically connected with one another; and the cooling apparatus includes a plurality of cooling apparatuses, each cooling apparatus communicating with a respective one of the plurality of airtight casings.

9. The battery cooling system of claim 1, wherein:

the battery cell includes a plurality of battery cells;

the airtight casing includes a plurality of airtight casings, each airtight casing holding a respective battery cell in the inside space, the plurality of battery cells being electrically connected whith one another; and the cooling apparatus communicates with each of the inside spaces of the plurality of airtight casings through a plurality of communicating pipes.

10. The battery cooling system of claim 1, wherein the battery cell includes a plurality of battery cells electrically connected with one another and arranged in parallel with one another in a longitudinal direction thereof in the airtight casing;

each of the plurality of battery cells has a positive side terminal and a negative side terminal provided on both ends in the longitudinal direction thereof; and the positive side terminal of one of the plurality of battery cells is connected to the negative side terminal of an adjacent one of the plurality of battery cells.

11. The battery cooling system of claim 1, wherein a plurality of cylindrical battery cells are hermetically held in the airtight casing with a staggered arrangement.

12. The battery cooling system of claim 1, wherein a plurality of cylindrical battery cells are hermetically held in the airtight casing.

13. The battery cooling system of claim 1, wherein a plurality of battery cells are hermetically held in the airtight casing spaced from one another.

14. A battery cooling system comprising:

a battery cell for producing electrical energy;

an airtight casing holding the battery cell in an inside space thereof, the inside space being filled with coolant; and a cooling apparatus communicating with the inside space of the airtight casing, the cooling apparatus being filled with the coolant, wherein the coolant absorbs heat developed by the battery cell in the inside space of the airtight casing to evaporate;

wherein the evaporated coolant moves into the cooling apparatus, and is condensed by the cooling apparatus; and wherein the cooling apparatus is disposed on an upper side of the battery cell in a vertical direction inside of the airtight casing.

15. The battery cooling system of claim 14, wherein the evaporated coolant rises to contact the cooling apparatus, and the condensed coolant descends toward the battery cell.

16. The battery cooling system of claim 14, wherein the cooling apparatus has a cooling pipe in which refrigerant used in an air conditioning refrigerating cycle flows.

17. The battery cooling system of claim 14, wherein the coolant is cooled in the cooling apparatus by exchanging heat with air flowing outside of the cooling apparatus.

18. The battery cooling system of claim 14, wherein the battery cell includes a plurality of battery cells electrically connected with one another and arranged in parallel with one another in a longitudinal direction thereof in the airtight casing;

each of the plurality of battery cells has a positive side terminal and a negative side terminal provided on both ends in the longitudinal direction thereof; and the positive side terminal of one of the plurality of battery cells is connected to the negative side terminal of an adjacent one of the plurality of battery cells.

19. The battery cooling system of claim 14, wherein a plurality of cylindrical battery cells are hermetically held in the airtight casing with a staggered arrangement.

20. The battery cooling system of claim 14, wherein a plurality of cylindrical battery cells are hermetically held in the airtight casing.

21. The battery cooling system of claim 14, wherein a plurality of battery cells are hermetically held in the airtight casing spaced from one another.

22. A battery cooling system comprising:

battery cell for producing electrical energy;

an airtight casing holding the battery cell in an inside space thereof, the inside space being filled with coolant; and a cooling apparatus communicating with the inside space of the airtight casing, the cooling apparatus being filled with the coolant, wherein the coolant absorbs heat developed by the battery cell in the inside space of airtight casing to evaporate;

wherein the evaporated coolant moves into the cooling apparatus, and is condensed by the cooling apparatus; and wherein the airtight casing is composed of a casing body with an opening that holds the battery cell, and a casing cover that hermetically covers the opening of the casing body and serves as the cooling apparatus.

23. The battery cooling system of claim 22, wherein the evaporated coolant rises to contact the cooling apparatus, and the condensed coolant descends toward the battery cell.

24. The battery cooling system of claim 22, wherein the cooling apparatus has a cooling pipe in which refrigerant used in an air conditioning refrigerating cycle flows.

25. The battery cooling system of claim 22, wherein the coolant is cooled in the cooling apparatus by exchanging heat with air flowing outside of the cooling apparatus.

26. The battery cooling system of claim 22, wherein the battery cell includes a plurality of battery cells electrically connected with one another and arranged in parallel with one another in a longitudinal direction thereof in the airtight casing;

each of the plurality of battery cells has a positive side terminal and a negative side terminal provided on both ends in the longitudinal direction thereof; and the positive side terminal of one of the plurality of battery cells is connected to the negative side terminal of an adjacent one of the plurality of battery cells.

27. The battery cooling system of claim 22, wherein a plurality of cylindrical battery cells are hermetically held in the airtight casing with a staggered arrangement.

28. The battery cooling system of claim 22, wherein a plurality of cylindrical battery cells are hermetically held in the airtight casing.

29. The battery cooling system of claim 22, wherein a plurality of battery cells are hermetically held in the airtight casing spaced from one another.

30. A battery cooling system comprising:

a battery cell for producing electrical energy;

an airtight casing holding the battery cell in an inside space thereof, the inside space being filled with coolant; and a cooling apparatus communicating with the inside space of the airtight casing, the cooling apparatus being filled with the coolant, wherein the coolant absorbs heat developed by the battery cell in the inside space of airtight casing to evaporate;

wherein the evaporated coolant moves into the cooling apparatus, and is condensed by the cooling apparatus;

the battery cell includes a plurality of battery cells electrically connected with one another and arranged in parallel with one another in a longitudinal direction thereof in the airtight casing;

each of the plurality of battery cells has a positive side terminal and a negative side terminal provided on both ends in the longitudinal direction thereof; and the positive side terminal of one of the plurality of battery cells is connected to the negative side terminal of an adjacent one of the plurality of battery cells wherein:

the airtight casing has a support base disposed in a lower portion of the airtight casing to divide the inside space into a main inside space and a lower inside space, both spaces being filled with the coolant;

the plurality of battery cells are disposed on the support base in the main inside space; and a wire connecting the positive side terminal of the one of the plurality of battery cells and the negative side terminal of the adjacent one of the plurality of battery cells is disposed within the lower inside space.

31. A battery cooling system comprising:

a battery cell for producing electrical energy;

an airtight casing holding the battery cell in an inside space thereof, the airtight casing being disposed with a longitudinal direction thereof approximately parallel to a horizontal direction, the inside space of the airtight casing being filled with coolant; and a cooling apparatus disposed on an upper wall of the airtight casing for cooling the upper wall of the airtight casing, wherein the coolant in the inside space of the airtight casing contacts the entire surface of the battery cell in the inside space of the airtight casing and absorbs heat around the battery cell to change into gaseous coolant;

wherein the gaseous coolant rises to contact the upper wall of the airtight casing in the inside space and is condensed; and wherein the condensed coolant returns to a position around the battery cell.

32. The battery cooling system of claim 31, wherein the cooling apparatus includes a cooling pipe in which fluid flows and a thermal conduction member disposed between the cooling pipe and the upper wall of the airtight casing for facilitating heat exchange between the upper wall of the airtight casing and the cooling pipe.

33. A battery cooling system comprising:

a battery cell for producing an electrical energy;

an airtight casing holding the battery cell in an inside space thereof filled with liquid coolant, the liquid coolant contacting the battery cell to absorb heat developed by the battery cell so that the liquid coolant changes into gaseous coolant by the heat; and a cooling apparatus disposed on an upper side of the battery cell in a vertical direction, for changing the gaseous coolant into the liquid coolant by heat exchange;

wherein the cooling apparatus has a cooling pipe in which fluid flows.

34. The battery cooling system of claim 23, wherein:

the cooling apparatus has a cooling apparatus casing filled with the liquid coolant and disposed on an upper outside of the airtight casing in the vertical direction, a communicating pipe connecting the cooling apparatus casing and the airtight casing, and a cooling pipe passing through the cooling apparatus casing and transporting low temperature fluid therein; and the gaseous coolant evaporated around the battery cell in the inside space of the airtight casing moves into the cooling apparatus casing through the communicating pipe due to natural convection, and is cooled by contacting the cooling pipe.

35. The battery cooling system of claim 33, wherein the cooling apparatus has a gas absorbing device disposed in the cooling apparatus casing for trapping molecules contained in the evaporated coolant.

* * * * *